United States Patent [19]

Norimatsu

[11] Patent Number: 5,475,739

[45] Date of Patent: Dec. 12, 1995

[54] RADIO TELEPHONE APPARATUS HAVING AUTOMATIC ANSWERING FUNCTION FOR CONFIDENTIAL MESSAGES

[75] Inventor: Noriko Norimatsu, Tokyo, Japan

[73] Assignee: NEC Corporation, Tokyo, Japan

[21] Appl. No.: 43,860

[22] Filed: Apr. 7, 1993

[30] Foreign Application Priority Data

Apr. 23, 1992 [JP] Japan .................................. 4-104450

[51] Int. Cl.⁶ .................................................. H04M 1/64
[52] U.S. Cl. ................................ 379/70; 379/73; 379/88; 379/58
[58] Field of Search .............................. 379/58, 67, 70, 379/73, 76, 77, 88, 142, 89

[56] References Cited

U.S. PATENT DOCUMENTS

| | | | |
|---|---|---|---|
| 4,122,306 | 10/1978 | Friedman et al. ........................ | 379/73 |
| 4,517,410 | 5/1985 | Williams et al. ......................... | 379/73 |
| 4,591,664 | 5/1986 | Freeman ................................... | 379/73 |
| 4,847,889 | 7/1989 | Eswaran ................................... | 379/67 |
| 4,985,913 | 1/1991 | Shalom et al. ........................... | 379/76 |
| 5,251,250 | 10/1993 | Obata et al. .............................. | 379/59 |
| 5,317,624 | 5/1994 | Obana et al. ............................. | 379/61 |

FOREIGN PATENT DOCUMENTS

0392446 10/1990 European Pat. Off. .

*Primary Examiner*—Jeffery A. Hofsass
*Assistant Examiner*—Scott L. Weaver
*Attorney, Agent, or Firm*—Foley & Lardner

[57] ABSTRACT

In an automatic answering telephone apparatus, a correspondence table between a plurality of record areas of a speech memory and a plurality of identification numbers is provided. When an identification number is received from a calling party, an answer message is output from one record area corresponding to the received identification number of the calling party. Two separate control circuits are used to control the identification and reproduction of a recorded message.

5 Claims, 9 Drawing Sheets

Fig. 2

| CHANNEL | ID |
|---|---|
| 1 | 1150 |
| 2 | 2291 |
| 3 | 6944 |
| 4 | 1312 |
| 5 | 7774 |
| 6 | 4349 |

RADIO TELEPHONE APPARATUS HAVING AUTOMATIC ANSWERING FUNCTION FOR CONFIDENTIAL MESSAGES

BACKGROUND OF THE INVENTION

1. Field of the Invention

The present invention relates to a telephone apparatus having an automatic answering function.

2. Description of the Related Art

In a prior art telephone apparatus, when an automatic answering function is set, the same speech or answer message is read out of a read-only memory (ROM) and is transmitted to a calling party.

In the above-mentioned prior art telephone apparatus, however, since the same answer message is transmitted to all calling parties, this answer message is not specific to any one calling party. In other words, it is impossible by the automatic answering function to transmit confidential messages to specific calling parties.

SUMMARY OF THE INVENTION

It is an object of the present invention to provide a telephone apparatus having an automatic answering function which can transmit confindential messages to specific calling parties.

According to the present invention, in an automatic answering telephone apparatus, a correspondence table between a plurality of record areas and a plurality of identification numbers is provided when an identification (ID) number is received from a calling party, and an answer message is output from one record area corresponding to the received identification number of the calling party.

DESCRIPTION OF THE PREFERRED EMBODIMENTS

Figure 1:
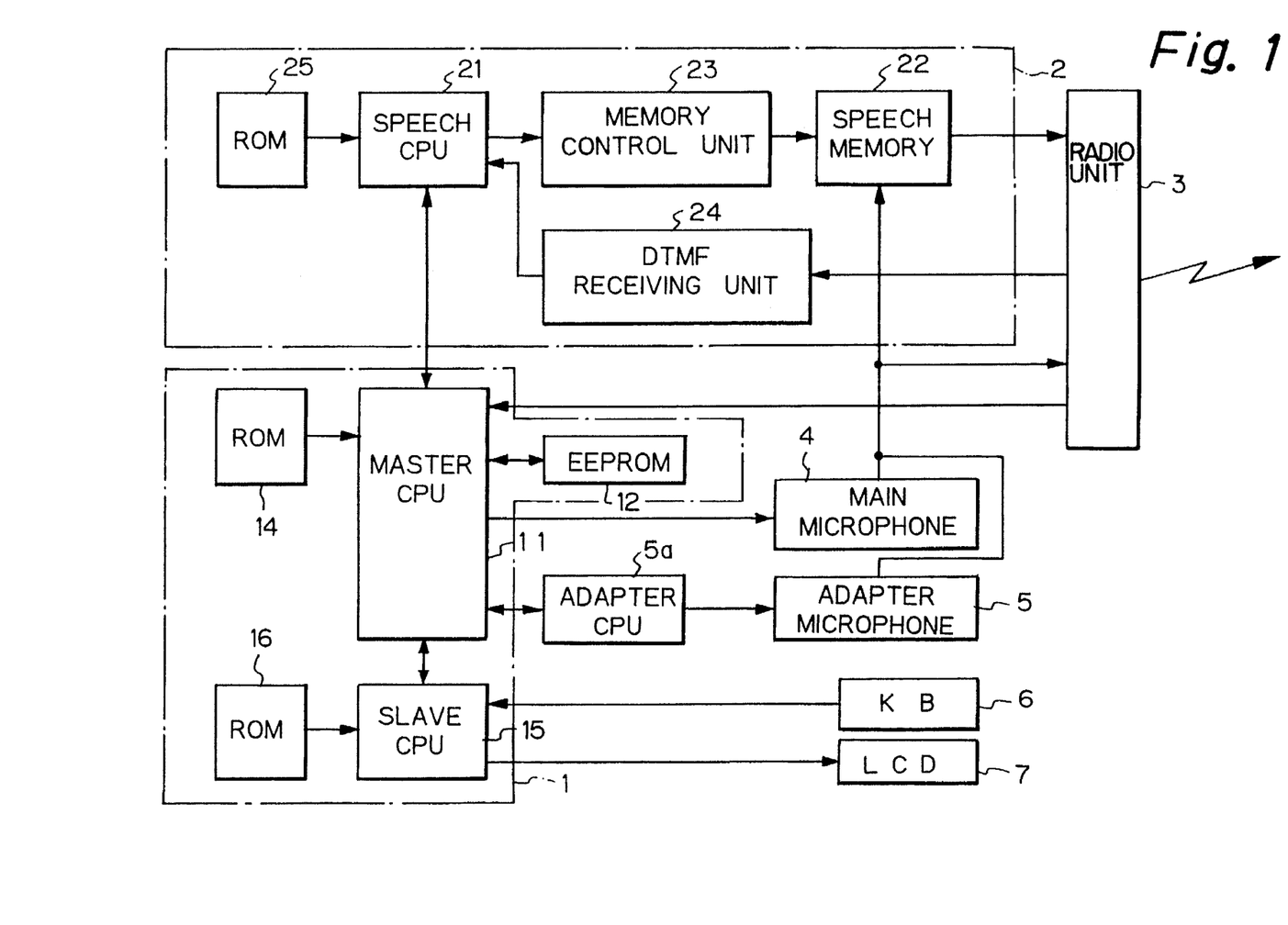
FIG. 1 is a block circuit diagram illustrating an embodiment of the telephone apparatus having an automatic answering function according to the present invention.

In FIG. 1, which illustrates an embodiment of the present invention, reference numeral 1 designates a main control portion, 2 an automatic answering control portion, 3 a radio unit, 4 a main microphone, 5 a handfree adapter microphone associated with an adapter CPU 5a, 6 a keyboard, and 7 a liquid crystal device (LCD).

The main control portion 1 includes a master CPU 11 for receiving a call from the radio unit 3, accessing a nonvolatile memory such as an EEPROM 12, activating the main microphone 4, and activating the adapter microphone 5 via the adapter CPU 5a. Note that the adapter CPU 5a gives a priority to operate the adapter microphone 5. That is, when the adapter microphone 5 is activated by the switch (not shown), the main microphone 4 is not activated. Reference numeral 14 designates a ROM for storing constants and programs for the master CPU 11. Also, reference numeral 15 designates a slave CPU for accessing the keyboard 6 and the LCD 7, and 16 designates a ROM for storing constants and programs for the slave CPU 15.

The keyboard 6 includes an automatic answering mode key, an ID registration start key, selection keys, an input start key, a record end key, and the like.

The automatic answering control portion 2 includes a speech CPU 21 for accessing a speech memory 22 formed by a random access memory (RAM) via a memory control unit 23, and receiving a signal from a dual-tone multifrequency signal (DTMF) receiving unit 24. Also, reference numeral 25 designates a ROM for storing constants and programs for the speech CPU 21.

The outputs of the main microphone 4 and the adapter microphone 5 are supplied to the speech memory 22 as well as the radio unit 3.

Figure 2:
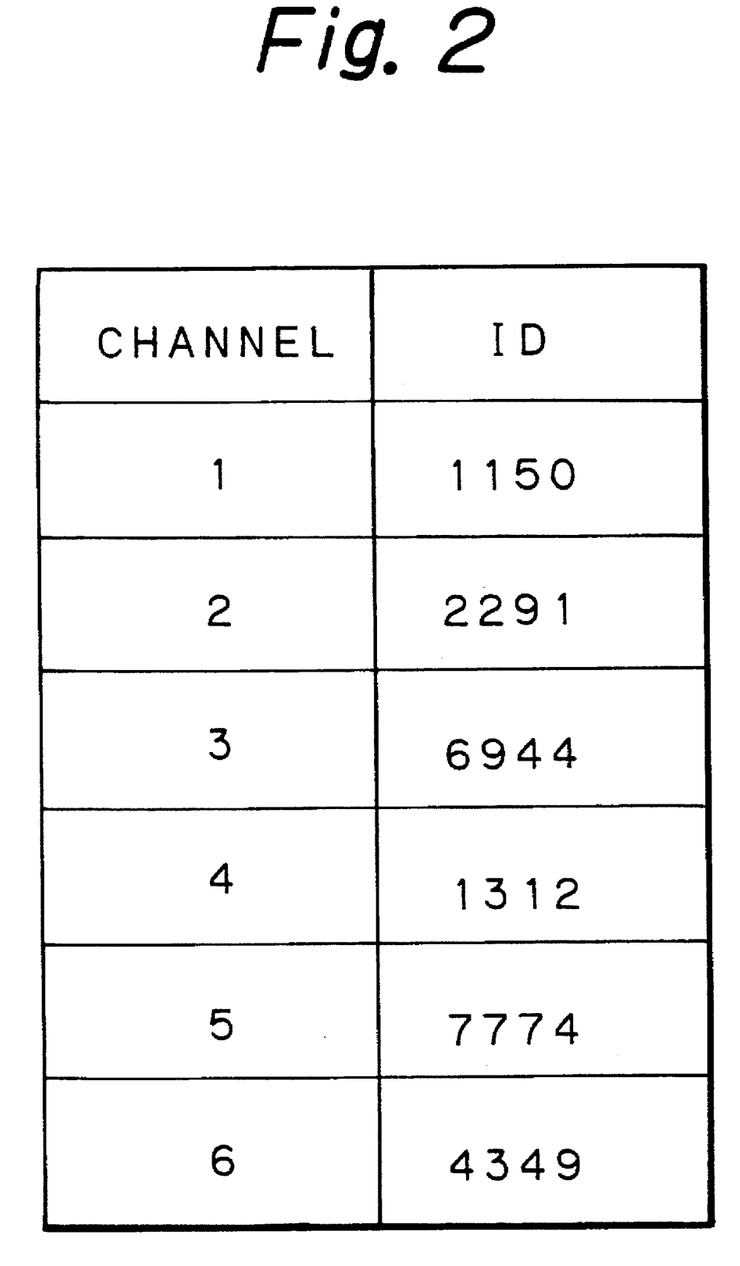
FIG. 2 is a diagram showing an example of the correspondence table stored in the EEPROM of FIG. 1.

According to the present invention, the speech memory 22 is divided into a plurality of record areas (channels) each for storing an answer message, and the EEPROM 12 stores a correspondence table between the channels and ID numbers, as shown in FIG. 2.

The operation of the master CPU 11 and the speech CPU 21 will be now explained with reference to FIGS. 3 through 9.

Figure 3:
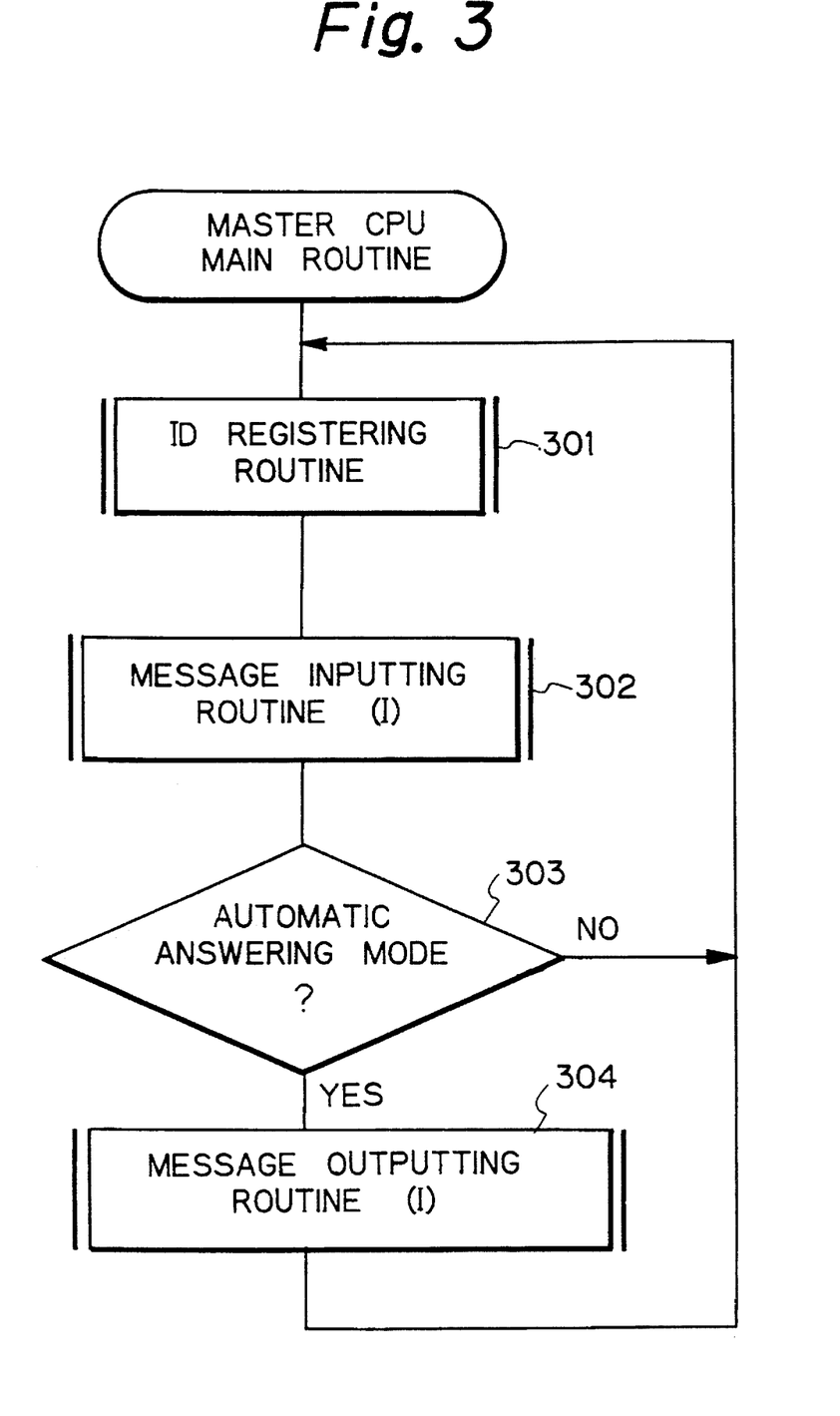
FIG. 3 is a flowchart showing the operation of the master central processing unit (CPU) of FIG. 1.

In FIG. 3, which shows a main routine of the master CPU 11, at step 301, an ID number preset for a calling party is registered, i.e., written into the EEPROM 12. Also, at step 302, an answer message is input. At step 303, it is determined whether or not the control is in an automatic answering mode. Note that the automatic answering mode is set by pushing an automatic answering key of the keyboard 6. Only if in an automatic answering mode, does the control proceed to step 304 which outputs an answer message. The steps 301, 302, 303 and 304 are repeated. These steps will be explained later in detail.

Figure 4:
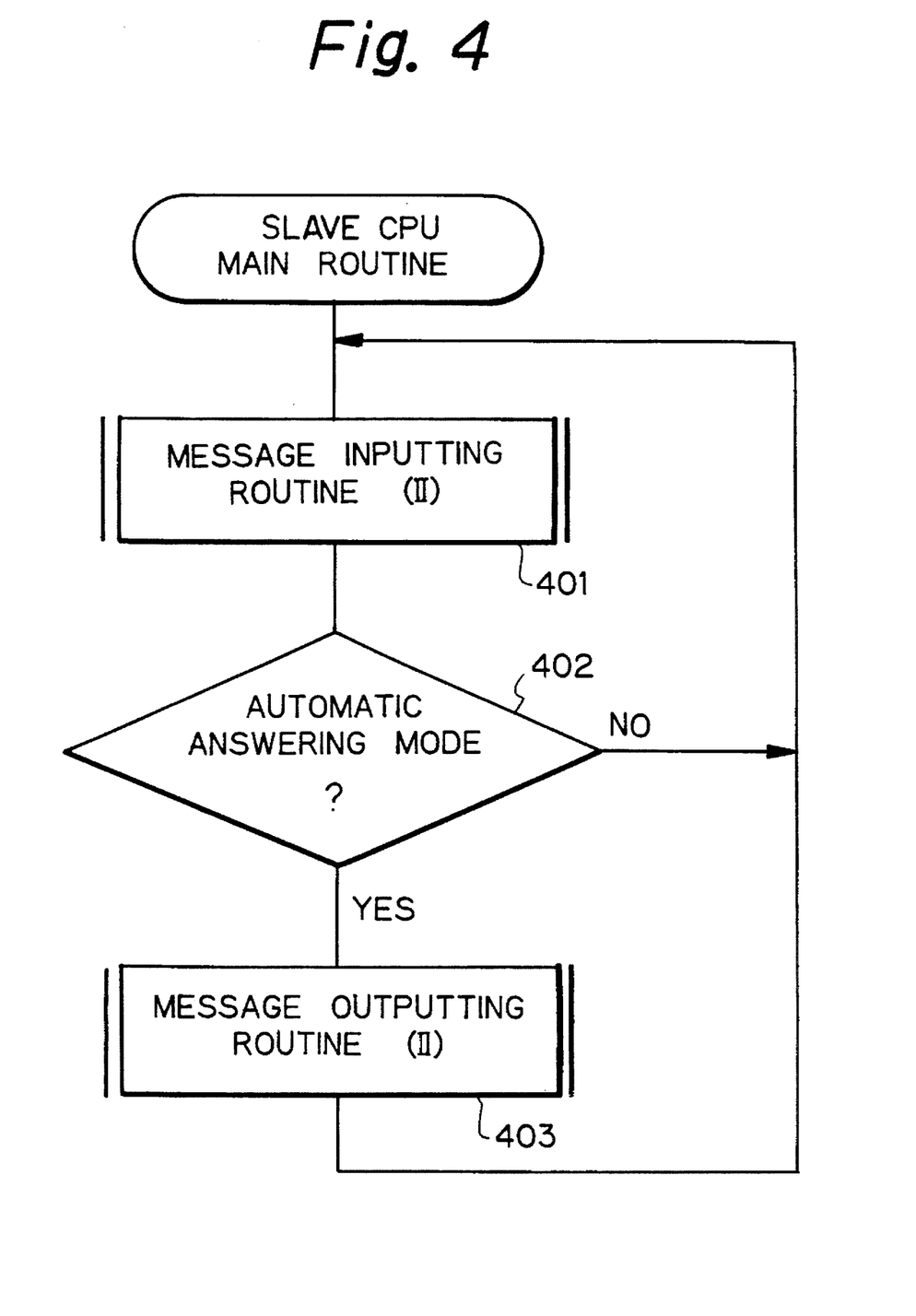
FIG. 4 is a flowchart showing the operation of the speech processor (CPU) of FIG. 1.

In FIG. 4, which shows a main routine of the speech CPU 21, at step 401, an answer message is input. At step 402, it is determined whether or not the control is in an automatic answering mode. Only if in an automatic answering mode, does the control proceed to step 403 which outputs an answer message. The steps 401, 402 and 403 are repeated. These steps will be explained later in detail.

From FIGS. 3 and 4, the input of an answer message is carried out by the association of the master CPU 11 and the speech CPU 21, and also, the output of an answer message is carried out by the association of the master CPU 11 and the speech CPU 21.

Figure 5:
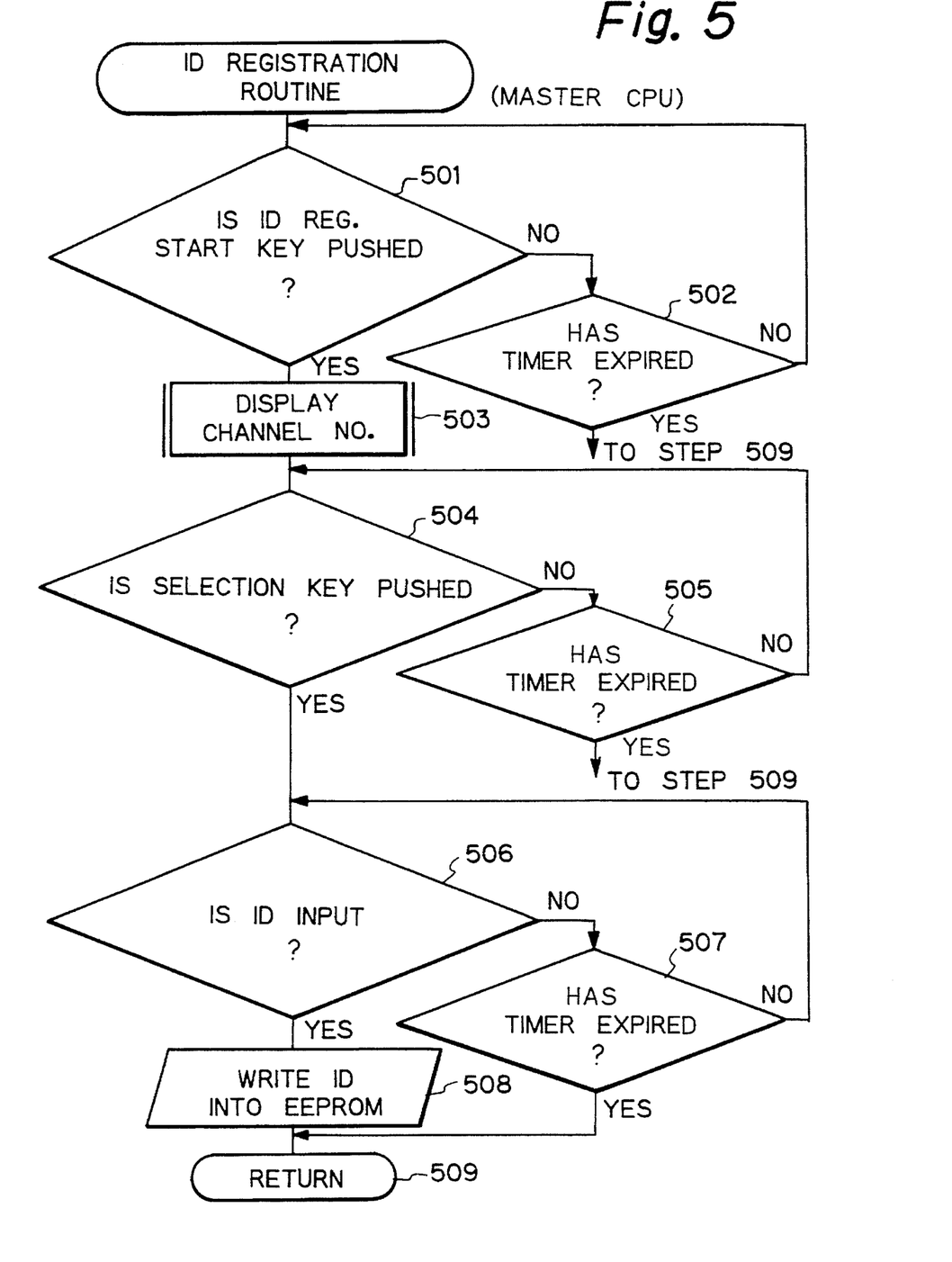
FIGS. 5, 6, 7, 8 and 9 are detailed flowcharts of FIG. 4.

In FIG. 5, which is a detailed flowchart of step 301 of FIG. 3, at step 501, it is determined whether the ID registration start key of the keyboard 6 is pushed. Only if this key is pushed, does the control proceed to step 503. Contrary to this, when this key is not pushed for a predetermined time period, the control proceeds via step 502 to step 509, thus completing this routine.

At step 503, the numbers such as 1, 2, 3, 4, 5 and 6 of channels of the speech memory 22 are displayed on the LCD 7, and at step 504, it is determined whether one of the selection keys of the keyboard 6 is pushed. Only if such an selection key is pushed, does the control proceed to step 506. Contrary to this, when no selection key is pushed for a predetermined time period, the control proceeds via step 505 to step 509 thus completing this routine.

At step 506, it is determined whether or not an ID number, which is, for example, formed by 4 arbitrary decimal digits, is input from the keyboard 6. Only if such an ID number is input, does the control proceed to step 508. Contrary to this, when an ID number is not input for a predetermined time period, the control proceeds via step 507 to step 509, thus completing this routine.

At step 508, the input ID number is written into the EEPROM 12 in correspondence with the selected channel number.

Thus, by the routine of FIG. 5, one ID number can be registered for the selected channel of the speech memory 22.

An operation of inputting (recording) an answer message will be explained next with reference to FIGS. 6 and 7.

Figure 6:
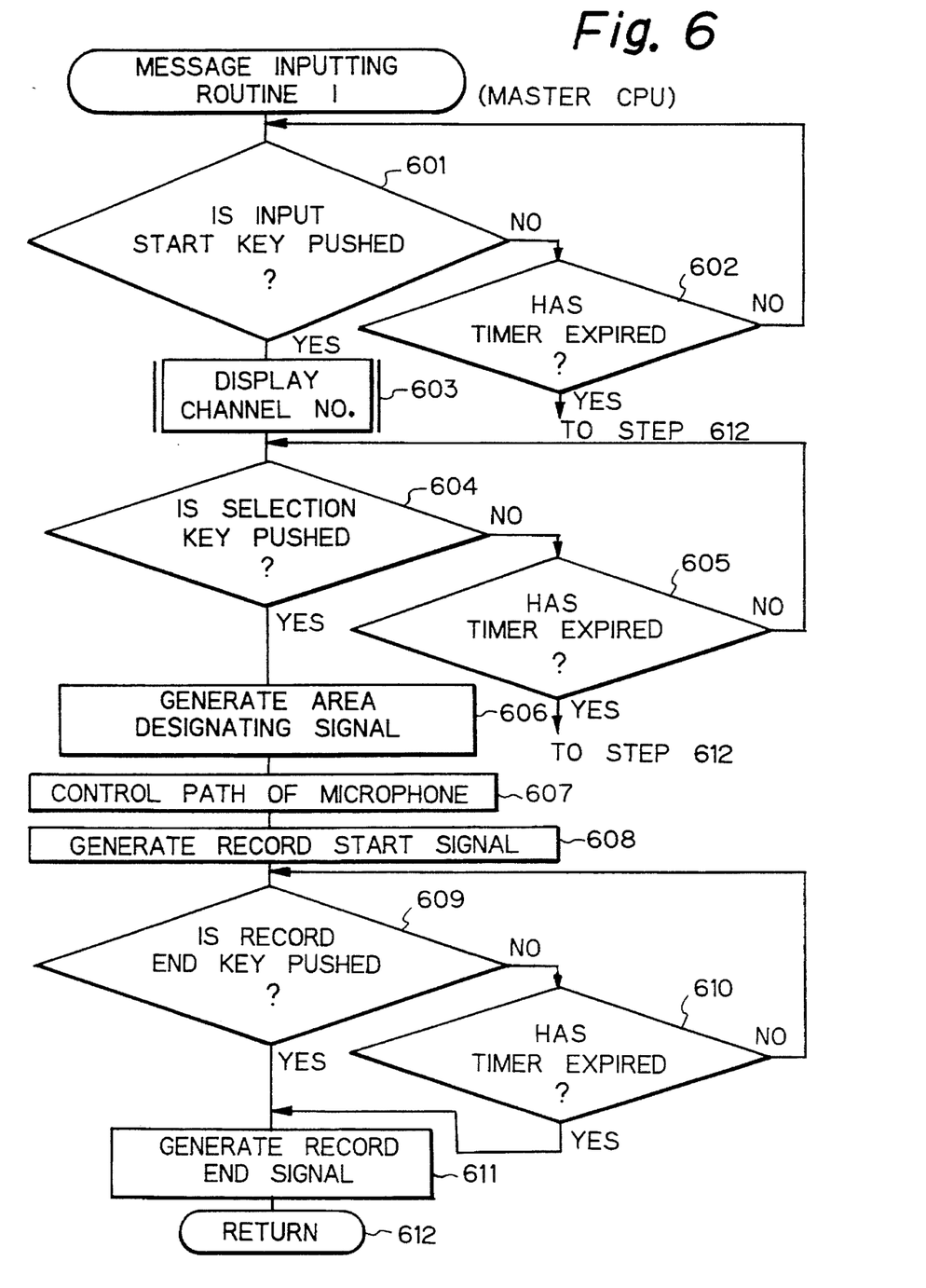

In FIG. 6, which is a detailed flowchart of step 302 of FIG. 3, at step 601, it is determined whether the input start key of the keyboard 6 is pushed. Only if this key is pushed, does the control proceed to step 603. Contrary to this, when this key is not pushed for a predetermined time period, the control proceeds via step 602 to step 612, thus completing this routine.

At step 604 the numbers such as 1, 2, 3, 4, 5 and 6 of channels of the speech memory 22 are displayed on the LCD 7, and at step 604, it is determined whether one of the selection keys of the keyboard 6 is pushed. Only if such an selection key is pushed, does the control proceed to step 606. Contrary to this, when no selection key is pushed for a predetermined time period, the control proceeds via step 605 to step 612 thus completing this routine.

At step 606, the master CPU 11 generates an area designating signal for designating one of the record areas of the speech memory 22 in accordance with the selected channel number, and transmits it to the speech CPU 21. Also, at step 607, the master CPU 11 controls the path of a signal from a microphone to the speech memory 22. In this case, the master CPU 11 activates the main microphone 4 or the adapter microphone 5 in accordance with the selection switch (not shown). Further, at step 608, the CPU 11 generates a record start signal and transmits it to the speech CPU 21.

At step 609, it is determined whether the record end key of the keyboard 6 is pushed. Also, at step 610, it is determined whether or not a predetermined time period has passed. As a result, when the record end key is pushed or the predetermined time period has passed, the control proceeds to step 611 which generates a record end signal and transmits it to the speech CPU 21.

Thus, the routine of FIG. 6 is completed by step 2.

Figure 7:
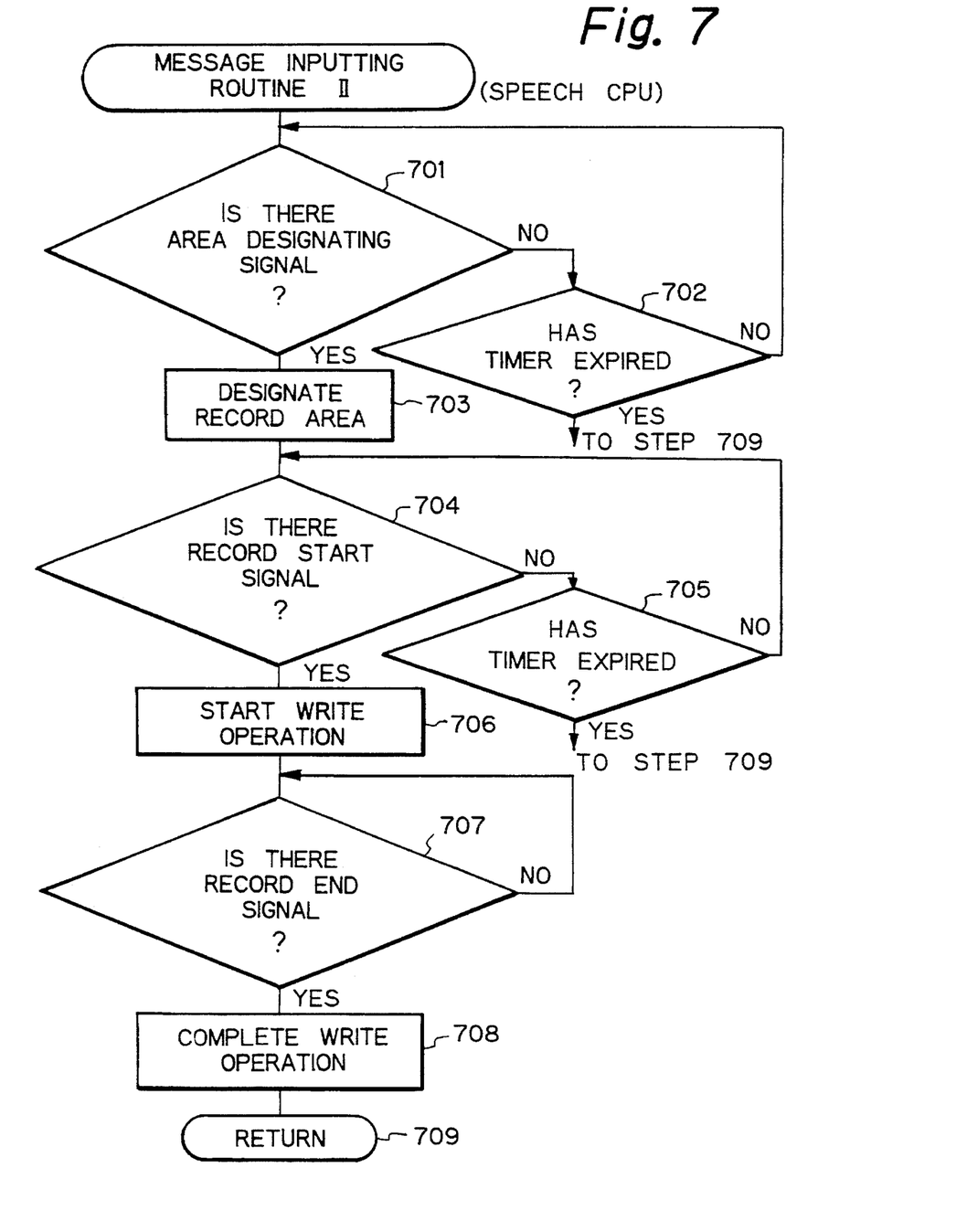

In FIG. 7, which is a detailed flowchart of step 401 of FIG. 4, at step 701, it is determined whether or not an area designating signal from the master CPU 11 is received. Only if this area designating signal is received by the speech CPU 21, does the control proceed to step 703. Contrary to this, when this area designating signal has not been received by the speech CPU 21 for a predetermined time period, the control proceeds via step 702 to step 709, thus completing this routine.

At step 703, the speech CPU 21 makes the memory control unit 23 designate a record area of the speech memory 22 in accordance with the received area designating signal. At step 704, it is determined whether or not a record start signal from the master CPU 11 is received. Only if this record start signal is received by the speech CPU 21, does the control proceed to step 705. Contrary to this, when this record start signal has not been received by the speech CPU 21 for a predetermined time period, the control proceeds via step 705 to step 709, thus completing this routine.

At step 706, the speech CPU 21 makes the memory control unit 23 start a write (record) operation of the speech memory 22 for the main microphone 4 or the adapter microphone 5.

At step 707, the speech CPU 21 awaits a record end signal from the master CPU 11. When the speech CPU 21 receives the record end signal, at step 708 the speech CPU 21 makes the memory control unit 23 complete the write (record) operation of the speech memory 22 for the main microphone 4 or the adapter microphone 5.

Then, the routine of FIG. 7 is completed by step 709.

According to the routines of FIGS. 6 and 7, a plurality of answer messages can be stored in the record areas of the speech memory 22.

An operation of outputting (regenerating) an answer message will be explained next with reference to FIGS. 8 and 9.

Figure 8:
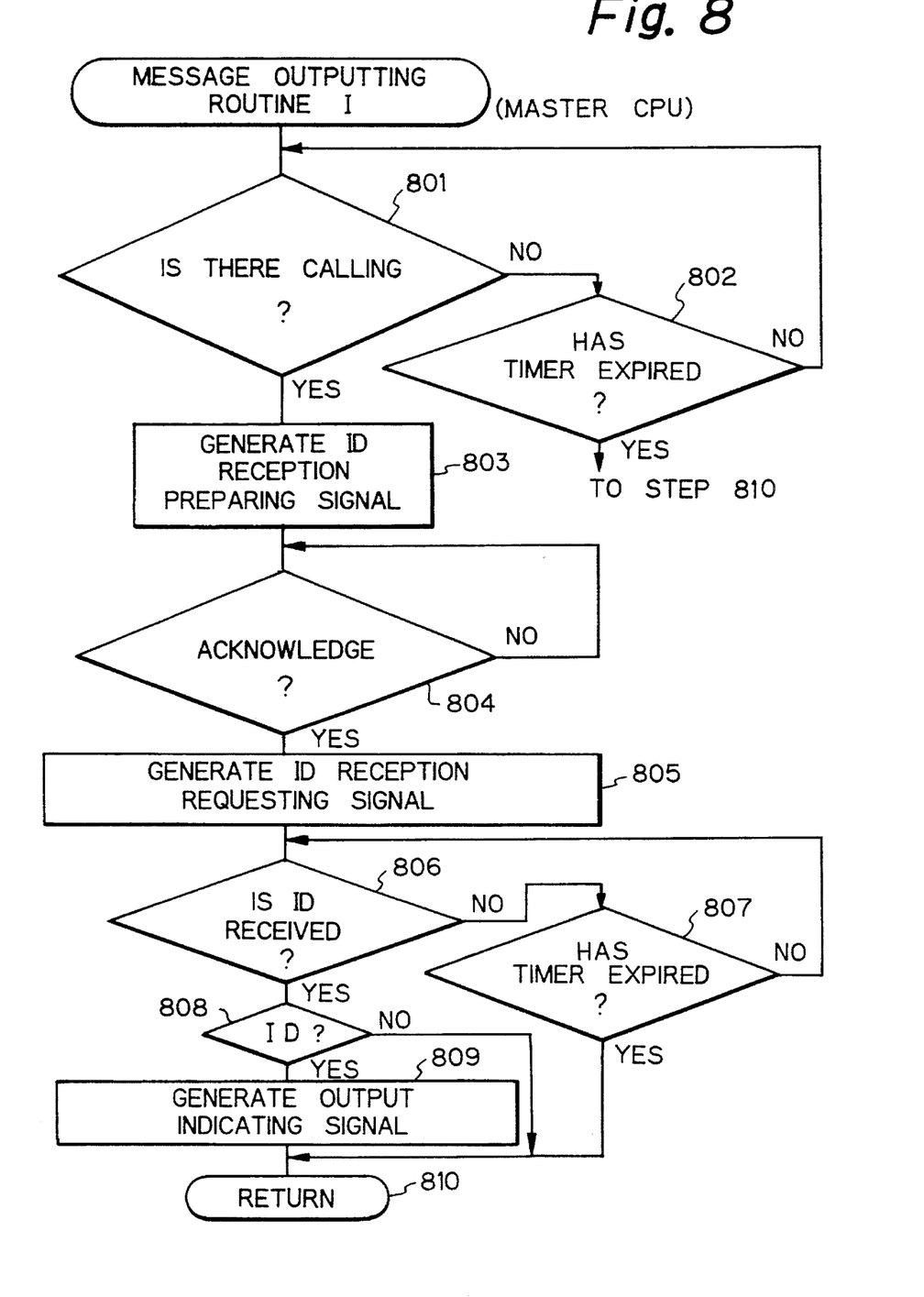

In FIG. 8, which is a detailed flowchart of step 304 of FIG. 3, at step 801, it is determined whether or not a call from the radio unit 3 is received. Only if such a call is received by the master CPU 11, does the control proceed to step 803. Contrary to a call, when this has not been received by the master CPU 11 for a predetermined time period, the control proceeds via step 802 to step 810, thus completing this routine.

At step 803, the master CPU 11 generates an ID reception preparing signal for a calling party and transmits it to the speech CPU 21, and at step 804, the master CPU 11 awaits an acknowledgement of receipt from the speech CPU 21.

After the master CPU 11 receives the above-mentioned acknowledgement of receipt from the speech CPU 21, the control proceeds to step 805 which generates an ID reception requesting signal for the calling party and transmits it to the speech CPU 21. Then, at step 806, the master CPU 11 awaits a four-digit ID number from the speech CPU 21 for a predetermined time period. Only if such an ID number is received by the master CPU 11, does the control proceed to step 808. Contrary to this, when such an ID number has not been received by the master CPU 11 for the predetermined time period, the control proceeds via step 802 to step 810, thus completing this routine.

At step 808, it is determined whether or not the ID number received by the speech CPU 21 is located in the EEPROM 12. As a result, if such an ID number is located in the EEPROM 12, the control proceeds to step 809. Otherwise, the control proceeds directly to step 810. At step 809, the master CPU 11 generates an output indicating signal for designating one of the record areas of the speech memory 22 in accordance with the received ID number and transmits it to the speech CPU 21.

Then, the routine of FIG. 8 is completed by step 810.

Figure 9:
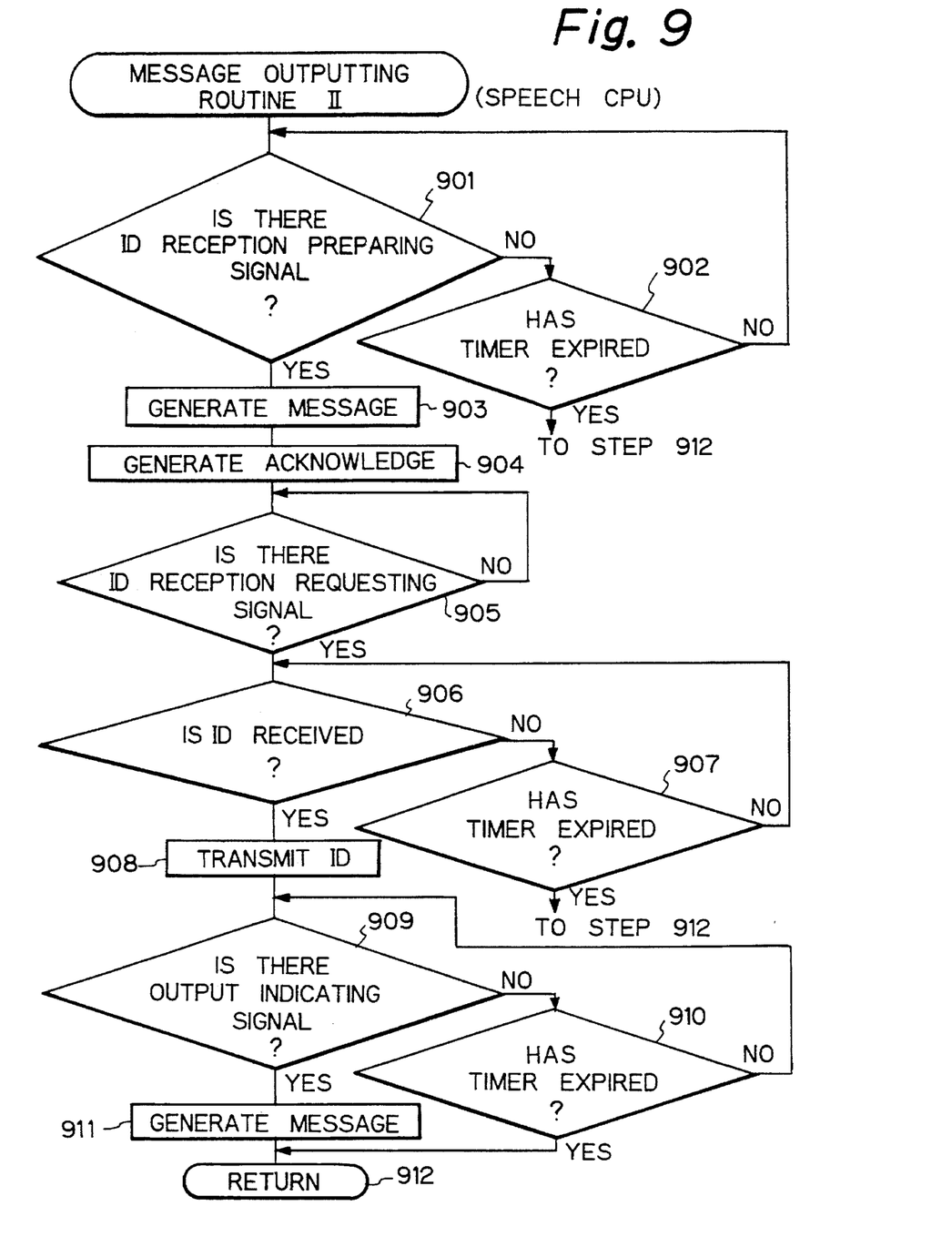

In FIG. 9, which is a detailed flowchart of step 403 of FIG. 4, at step 901, it is determined whether or not an ID reception preparing signal from the master CPU 11 (see: step 803 of FIG. 8) is received. Only if this ID reception preparing signal is received by the speech CPU 21, does the control proceed to step 903. Contrary to this, when this ID reception preparing signal has not been received by the speech CPU 21 for a predetermined time period, the control proceeds via step 902 to step 912, thus completing this routine.

At step 903, the speech CPU 21 makes the memory control unit 23 designate a predetermined record area of the speech memory 22 to generate a message such as "Please key in a four-digit ID."

Then, at step 904, the speech CPU 21 generates an acknowledgement of receipt of the reception preparing signal from the master CPU 11 and transmits it to the master CPU 11 (see step 804 of FIG. 8).

At step 905, the speech CPU 21 awaits an ID reception requesting signal from the master CPU 11. When the speech CPU 21 receives such an ID reception requesting signal from the master CPU 11, the control proceeds to step 906.

At step 906, it is determined whether or not an ID designating signal from the master CPU 11 is received. Only if such an ID number is received by the speech CPU 21, does the control proceed to step 908. Contrary to this, when such an ID number has not been received by the speech CPU 21 for a predetermined time period, the control proceeds via step 902 to step 912, thus completing this routine.

At step 908, the speech CPU 21 transmits the received ID number to the master CPU 11 (see step 806 of FIG. 8).

At step 909, it is determined whether or not an output indicating signal from the master CPU 11 is received. Only if this output indicating signal is received by the speech CPU 21, does the control proceed to step 910. Contrary to this, when such an output indicating signal has not been received by the speech CPU 21 for a predetermined time period, the control proceeds via step 910 to step 912, thus completing this routine.

At step 911, the speech CPU 21 makes the memory control unit 23 designate one of the record areas of the speech memory 22, thus outputting an answer message in response to the received ID number.

Thus, the routine of FIG. 9 is completed by step 912.

According to the routines of FIGS. 8 and 9, when an ID number from a calling party is registered in the EEPROM 12, an answer message is selected from a plurality of answer messages stored in the speech memory 22 in accordance with the ID number, and is then output.

As explained hereinbefore, according to the present invention, confidential answer messages can be output to specific calling parties.

I claim:

1. A radio telephone apparatus having an automatic answering function comprising:

a radio unit;

a speech memory connected to said radio unit, said speech memory being divided into a plurality of record areas, each area for storing an answer message;

a correspondence table memory for storing a correspondence between stored identification numbers and said record areas;

an identification number receiving circuit, connected to said radio unit, for receiving an identification number of a call to said telephone apparatus;

a first control circuit connected to said radio unit and said correspondence table memory; and a second control circuit connected to said speech memory via a memory control unit, to said identification number receiving circuit and to said first control circuit, wherein said first control circuit includes means for determining if said radio unit is receiving a call, means for transmitting an identification number reception preparing signal to said second control circuit in response to a call being received by said radio unit, means for transmitting an identification number reception requesting signal to said second control circuit in response to said identification number reception preparing signal being received by said second control circuit, means for determining if said identification number of said call is located in said correspondence table memory, and means for transmitting an output indicating signal to said second control circuit if said identification number of said call is located in said correspondence table memory, and wherein said second control circuit includes means for transmitting a first message from said speech memory to said radio unit in response to said identification number reception preparing signal from said first control circuit, means for receiving said identification number of said call from said identification number receiving circuit in response to said identification number reception requesting signal from said first control circuit, and for transmitting said identification number of said call received from said identification number receiving circuit to said first control circuit, and means for transmitting a second message from said speech memory to said radio unit in response to said output indicating signal from said first control circuit, said second message being derived from one of said record areas which corresponds in said correspondence table memory to said identification number of said call.

2. An apparatus as set forth in claim 1, wherein said first control circuit further comprises means for registering a new identification number in said correspondence table memory.

3. An apparatus as set forth in claim 1, wherein:

said first control circuit further includes means for transmitting an area designating signal for designating one of said record areas to said second control circuit in response to an operation of a selection key, means for transmitting a record start signal to said second control circuit after said area designating signal is transmitted from said first control circuit to said second control circuit, and means for transmitting a record end signal to said second control circuit in response to an operation of a record end key; and said second control circuit further includes means for designating one of said record areas of said speech memory in response to said area designating signal from said first control circuit, means for starting a write operation of a message of said one of said record areas of said speech memory in response to said record start signal from said first control circuit, and means for ending said write operation of the message in response to said record end signal from said first control circuit.

4. An apparatus as set forth in claim 1, wherein said correspondence table memory comprises a nonvolatile memory.

5. An apparatus as set forth in claim 1, wherein said identification number receiving circuit comprises a DTMF receiving unit.

\* \* \* \* \*